United States Patent
Faivre et al.

(10) Patent No.: US 12,453,933 B2
(45) Date of Patent: Oct. 28, 2025

(54) FILTER PANEL WITH LATTICE SUPPORT STRUCTURE FOR FILTER DRUM

(71) Applicant: ETABLISSEMENTS FAIVRE, Baume les Dames (FR)

(72) Inventors: Jean-Louis Faivre, Serre les Sapins (FR); Frédéric Faivre, Baume les Dames (FR); Aubert Faivre, Besancon (FR)

(73) Assignee: ETABLISSEMENTS FAIVRE, Baume les Dames (FR)

( * ) Notice: Subject to any disclaimer, the term of this patent is extended or adjusted under 35 U.S.C. 154(b) by 355 days.

(21) Appl. No.: 17/926,257

(22) PCT Filed: Apr. 7, 2021

(86) PCT No.: PCT/FR2021/050608
§ 371 (c)(1),
(2) Date: Nov. 18, 2022

(87) PCT Pub. No.: WO2021/234235
PCT Pub. Date: Nov. 25, 2021

(65) Prior Publication Data
US 2023/0201749 A1    Jun. 29, 2023

(30) Foreign Application Priority Data
May 20, 2020  (FR) ...................... 2005268

(51) Int. Cl.
*B01D 33/067*  (2006.01)
*B01D 33/46*   (2006.01)

(52) U.S. Cl.
CPC ......... *B01D 33/067* (2013.01); *B01D 33/463* (2013.01)

(58) Field of Classification Search
None
See application file for complete search history.

(56) References Cited

U.S. PATENT DOCUMENTS 445,223 A * 1/1891 Knight ................. B01D 37/025
                                              55/501
485,488 A * 11/1892 Cockrell ................... B02B 3/04
                                              100/297

(Continued)

FOREIGN PATENT DOCUMENTS

CN       204017500 U    12/2014
DE    202010008227 U1   10/2010

(Continued)

OTHER PUBLICATIONS

Foreign Communication from a Related Counterpart Application, International Search Report dated Jul. 8, 2021, International Application No. PCT/FR2021/050608 filed on Apr. 7, 2021.

(Continued)

Primary Examiner — Robert J Popovics
(74) Attorney, Agent, or Firm — Conley Rose, P.C.

(57) ABSTRACT

The present invention relates to a filter panel which is intended to be mounted in a drum filter, the filter panel comprising a peripheral frame to which a filter cloth is fixed, the frame being formed by two longitudinal members which are connected at each end by an end cross-member, characterized in that the filter panel comprises a lattice (R1) of crosspieces which connect the inner edges of the frame to one another, the lattice (R1) of crosspieces forming at least a first closed pattern (54) in the centre of the frame and comprising at least four diagonals which are inclined with respect to the longitudinal members and which extend from the first closed pattern to an inner edge of the frame.

18 Claims, 4 Drawing Sheets

(56) References Cited

U.S. PATENT DOCUMENTS

| | | | | | |
|---|---|---|---|---|---|
| 828,715 | A * | 8/1906 | Cook | B01D 29/111 | 166/234 |
| 979,182 | A * | 12/1910 | MacDonald | E03F 5/06 | 210/163 |
| 1,223,245 | A * | 4/1917 | Biesel | B01D 33/09 | 210/395 |
| 1,344,747 | A * | 6/1920 | Wright | B01D 33/0384 | 209/397 |
| 1,561,632 | A * | 11/1925 | Woodward | B07B 1/469 | 209/397 |
| 1,663,298 | A * | 3/1928 | Geer | B01D 39/1692 | 162/903 |
| 1,742,964 | A * | 1/1930 | McNally | A01J 11/06 | 210/463 |
| 1,746,409 | A * | 2/1930 | Sweetland | B01D 33/82 | 210/486 |
| 1,851,809 | A * | 3/1932 | Carter | B01D 33/11 | 210/403 |
| 1,930,128 | A * | 10/1933 | Lund | B01D 39/10 | 100/145 |
| 1,939,314 | A * | 12/1933 | Neifert | B07B 13/003 | 209/397 |
| 1,981,568 | A * | 11/1934 | Owen | B65D 90/023 | 220/4.12 |
| 2,002,936 | A * | 5/1935 | Davies | B01D 46/522 | 55/499 |
| 2,028,466 | A * | 1/1936 | Moran | B01D 29/39 | 210/486 |
| 2,294,179 | A * | 8/1942 | Hawley | B01D 33/073 | 210/396 |
| 2,740,335 | A * | 4/1956 | Greulich | E04C 2/423 | 52/666 |
| 2,910,183 | A * | 10/1959 | Hayes | B01D 33/11 | 210/315 |
| 2,964,194 | A * | 12/1960 | Oliver, Jr. | B01D 33/23 | 210/486 |
| 3,221,887 | A * | 12/1965 | Schade | B01D 33/463 | 210/333.1 |
| 3,263,819 | A * | 8/1966 | Schmidt | B01D 29/41 | 210/488 |
| 3,295,687 | A * | 1/1967 | Schmerler | B01D 29/39 | 55/379 |
| 3,306,457 | A * | 2/1967 | Putnam | B01D 33/067 | 210/330 |
| 3,419,150 | A * | 12/1968 | Davis | B01D 33/465 | 210/404 |
| 3,623,614 | A * | 11/1971 | Schmidt, Jr. | B01D 29/111 | 210/486 |
| 3,724,671 | A * | 4/1973 | Tate | B01D 46/10 | D23/209 |
| 4,038,187 | A * | 7/1977 | Saffran | B01D 33/067 | 210/411 |
| 4,222,865 | A * | 9/1980 | Valeri | B01D 33/067 | 209/407 |
| 4,276,169 | A * | 6/1981 | Browne | B01D 33/09 | 210/406 |
| 4,280,913 | A * | 7/1981 | Applegate | B01D 33/808 | 210/669 |
| 4,551,248 | A * | 11/1985 | Lenac | B01D 33/09 | 210/406 |
| 4,563,270 | A * | 1/1986 | Wolff | B07B 1/50 | 209/397 |
| 4,584,221 | A * | 4/1986 | Kung | E01C 13/045 | 428/44 |
| 4,620,927 | A * | 11/1986 | Casper | B01D 33/067 | 210/403 |
| 4,690,360 | A * | 9/1987 | Looker | B65D 88/14 | 108/57.32 |
| 4,728,468 | A * | 3/1988 | Duke | F28F 25/085 | 52/581 |
| 4,814,081 | A * | 3/1989 | Malinowski | B29C 48/362 | 428/116 |
| 4,832,905 | A * | 5/1989 | Bryan | G21C 3/322 | 210/488 |
| 4,859,332 | A * | 8/1989 | Johnson | B01D 29/66 | 210/486 |
| 4,917,862 | A * | 4/1990 | Kraw | B01D 53/12 | 95/134 |
| 4,932,532 | A * | 6/1990 | Apps | B65D 71/70 | 220/519 |
| 5,035,799 | A * | 7/1991 | Rosberg | B01D 29/66 | 210/411 |
| 5,076,924 | A * | 12/1991 | Persson | B01D 29/39 | 55/494 |
| 5,211,291 | A * | 5/1993 | Kelley | B27N 1/00 | 209/264 |
| 5,287,966 | A * | 2/1994 | Stahl | B65D 21/041 | 206/509 |
| 5,330,644 | A * | 7/1994 | Nilsson | B01D 33/23 | 210/324 |
| 5,361,287 | A * | 11/1994 | Williamson | G21C 3/3206 | 376/443 |
| 5,407,563 | A * | 4/1995 | Blake | B01D 33/461 | 210/402 |
| 5,476,526 | A * | 12/1995 | Attermeyer | B01D 46/0002 | 55/496 |
| 5,528,640 | A * | 6/1996 | Johansson | G21C 3/3206 | 376/310 |
| 6,049,581 | A * | 4/2000 | Mayet | G21C 3/32 | 376/443 |
| 6,105,788 | A * | 8/2000 | Williamson | B01D 29/908 | 428/116 |
| 6,283,302 | B1 * | 9/2001 | Schulte | B07B 1/4654 | 209/403 |
| 6,443,310 | B1 * | 9/2002 | Schulte, Jr. | B01D 33/0376 | 210/488 |
| 6,484,885 | B1 * | 11/2002 | Lilie | B07B 1/469 | 209/264 |
| 6,751,912 | B2 * | 6/2004 | Stegner | E01C 5/20 | 52/177 |
| 6,769,550 | B2 * | 8/2004 | Adams | B01D 29/07 | 209/403 |
| 6,790,261 | B1 * | 9/2004 | Delts | B01D 46/10 | 55/501 |
| 6,938,779 | B2 * | 9/2005 | Burnett | B07B 1/469 | 209/405 |
| D548,826 | S * | 8/2007 | Katta | D23/364 | |
| 7,303,079 | B2 * | 12/2007 | Reid-Robertson | B29C 45/16 | 209/412 |
| 7,306,727 | B2 * | 12/2007 | Perreault | B01D 63/089 | 210/488 |
| 7,677,835 | B2 * | 3/2010 | Oscar | B65D 90/027 | 405/39 |
| D618,368 | S * | 6/2010 | Jenkins | D25/156 | |
| 8,123,436 | B2 * | 2/2012 | Larach | E03F 1/005 | 405/36 |
| D657,859 | S * | 4/2012 | Platt | D23/365 | |
| 8,231,010 | B2 * | 7/2012 | Scott | E21B 21/065 | 209/397 |
| 8,475,659 | B2 * | 7/2013 | Oh | B01D 35/303 | 210/167.01 |
| D718,844 | S * | 12/2014 | Johansen | D23/261 | |
| 9,643,111 | B2 * | 5/2017 | Larson | E21B 21/06 | |
| 10,086,408 | B2 * | 10/2018 | Cady | B07B 1/4618 | |
| 10,556,196 | B2 * | 2/2020 | Larson | B07B 1/4609 | |
| 10,878,970 | B2 * | 12/2020 | Walton | G21C 19/205 | |
| 10,946,318 | B2 * | 3/2021 | Thysell | B01D 33/067 | |
| 11,492,793 | B2 * | 11/2022 | Kulick, III | E03F 1/002 | |
| 11,517,834 | B2 * | 12/2022 | Moon | B01D 33/23 | |
| 11,707,766 | B2 * | 7/2023 | Colgrove | B07B 1/4618 | 210/808 |
| 11,938,424 | B2 * | 3/2024 | Han | C02F 1/003 | |
| 11,975,275 | B2 * | 5/2024 | Dam | B01D 29/07 | |
| 12,128,335 | B2 * | 10/2024 | Persson | B01D 33/073 | |
| 12,138,661 | B2 * | 11/2024 | Colgrove | B01D 29/925 | |
| 12,246,272 | B2 * | 3/2025 | Collins | B01D 29/05 | |
| 12,311,292 | B2 * | 5/2025 | Song | B01D 29/15 | |

(56) References Cited

U.S. PATENT DOCUMENTS

| | | | |
|---|---|---|---|
| 2002/0191065 A1* | 12/2002 | Temple | B41J 13/226 |
| | | | 347/104 |
| 2004/0206679 A1* | 10/2004 | Bleigh | B01D 35/303 |
| | | | 210/97 |
| 2004/0238424 A1* | 12/2004 | Thompson | E03F 5/06 |
| | | | 210/163 |
| 2004/0245155 A1* | 12/2004 | Strong | B01D 33/0376 |
| | | | 209/405 |
| 2005/0067327 A1* | 3/2005 | Adams | B07B 1/469 |
| | | | 209/408 |
| 2005/0236305 A1* | 10/2005 | Schulte, Jr. | B07B 1/46 |
| | | | 209/403 |
| 2007/0227094 A1* | 10/2007 | Oscar | B65D 90/027 |
| | | | 52/630 |
| 2011/0044760 A1* | 2/2011 | Larach | E03F 1/005 |
| | | | 405/52 |
| 2011/0099960 A1* | 5/2011 | Menssen | B01D 46/0006 |
| | | | 55/480 |
| 2012/0155963 A1* | 6/2012 | Larach | E03F 1/005 |
| | | | 405/52 |
| 2016/0101377 A1* | 4/2016 | Cady | B07B 1/4645 |
| | | | 210/489 |
| 2018/0178147 A1* | 6/2018 | Thysell | B01D 25/215 |
| 2018/0185879 A1* | 7/2018 | Torres Jara | B07B 1/4618 |
| 2018/0221830 A1* | 8/2018 | Larson | H01J 5/18 |
| 2019/0388809 A1* | 12/2019 | Rawls | B01D 33/067 |
| 2020/0330905 A1* | 10/2020 | Dam | B01D 29/56 |
| 2020/0391144 A1* | 12/2020 | Gerganoff | B01D 33/155 |
| 2021/0008473 A1* | 1/2021 | Moon | B01D 33/23 |
| 2022/0054958 A1* | 2/2022 | Han | B01D 36/001 |
| 2022/0305413 A1* | 9/2022 | Persson | B01D 29/03 |
| 2022/0331722 A1* | 10/2022 | Holindrake | B01D 33/06 |
| 2023/0081259 A1* | 3/2023 | Huang | B01D 29/111 |
| | | | 100/127 |
| 2023/0136410 A1* | 5/2023 | Collins | B01D 29/05 |
| | | | 210/435 |
| 2023/0166203 A1* | 6/2023 | Song | C02F 1/001 |
| | | | 210/455 |
| 2023/0201749 A1* | 6/2023 | Faivre | B01D 33/463 |
| | | | 210/404 |
| 2023/0271114 A1* | 8/2023 | Dam | B01D 29/56 |
| | | | 210/489 |
| 2024/0017197 A1* | 1/2024 | Schumacher | B01D 46/58 |
| 2024/0017200 A1* | 1/2024 | Schumacher | B01D 46/121 |
| 2024/0066450 A1* | 2/2024 | Lee | B01D 29/00 |

FOREIGN PATENT DOCUMENTS

| | | |
|---|---|---|
| FR | 3039775 A1 | 2/2017 |
| GB | 1513373 A | 6/1978 |
| WO | 2021234235 A1 | 11/2021 |

OTHER PUBLICATIONS

Foreign Communication from a Related Counterpart Application, Written Opinion dated Jul. 8, 2021, International Application No. PCT/FR2021/050608 filed on Apr. 7, 2021.

\* cited by examiner

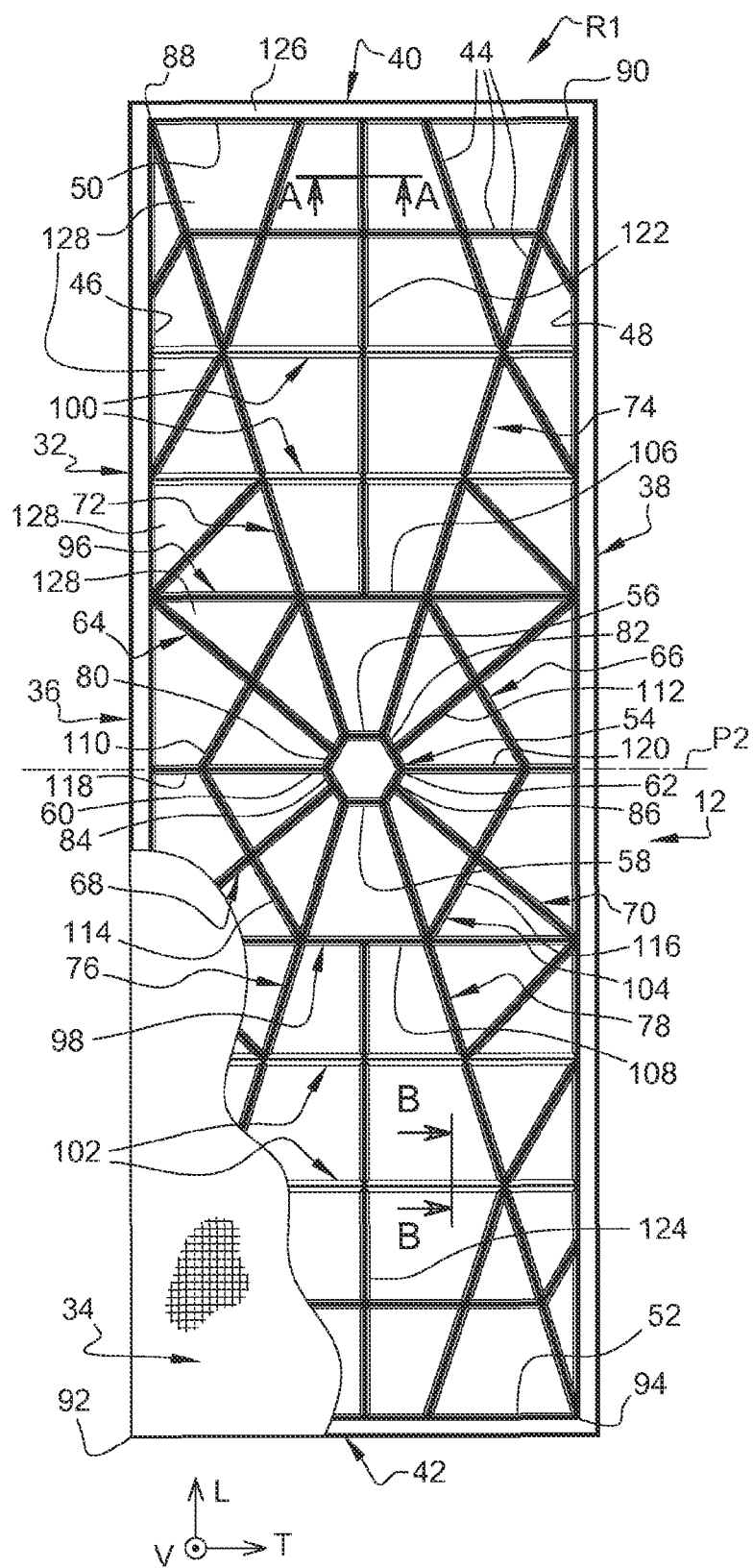
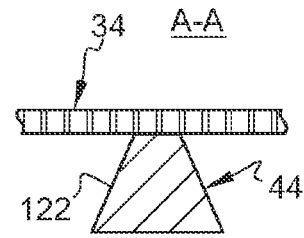
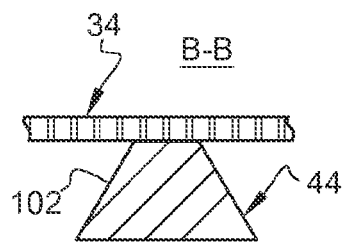

FILTER PANEL WITH LATTICE SUPPORT STRUCTURE FOR FILTER DRUM

CROSS-REFERENCE TO RELATED APPLICATIONS

The present application is a filing under 35 U.S.C. 371 as the National Stage of International Application No. PCT/FR2021/050608, filed Apr. 7, 2021, entitled "FILTERING PANEL AND DRUM FILTER PROVIDED WITH SUCH PANELS," which claims priority to French Application No. 2005268 filed with the Intellectual Property Office of France on May 20, 2020, both of which are incorporated herein by reference in their entirety for all purposes.

TECHNICAL SCOPE OF THE INVENTION

The present invention relates to a filter panel of the type intended to be mounted in a drum filter and an associated drum filter.

The invention relates more particularly to a filter panel comprising a peripheral frame and a filter cloth attached to the frame.

TECHNICAL BACKGROUND

Drum filters are known to be used, for example, for water treatment upstream of an industrial plant, particularly with large liquid flows. This type of drum filter comprises a filter drum which is rotatably mounted in a tank and partially immersed in the liquid flow to be filtered.

The drum has a plurality of filter panels distributed around its periphery in one or more rows. Each filter panel comprises a frame covered with a filter cloth. Each filtering panel is bent and then fixed to the drum so as to follow the curvature of the drum around its axis of rotation.

The liquid entering the tank enters the interior of the drum and then passes through the filter panels radially by gravity from the inside to the outside and then flows out of the tank. Thus, debris and other impurities are deposited on the inside of the filter panels, on the filter cloth.

In order to be able to clean the filter surface while continuing filtration, the filter is mounted to rotate around the drum axis. To clean a part of the filter surface, the drum is rotated around its axis to remove the part of the filter surface to be cleaned from the liquid. The filtering surface can then be cleaned by spraying liquid through a spray bar arranged at the periphery of the drum.

Filter panels are generally made of a fabric stretched over a frame. One of the difficulties in making filter panels is that they must withstand the weight of the sludge that accumulates in the drum and the successive cycles of filtration and cleaning.

Wire cloths have the advantage of being very strong but relatively expensive. Alternatively, it is known that filter cloths can be made of plastic material, for example polypropylene. The manufacturing cost is much lower than that of metal cloths, but this type of filter cloth is much more fragile. In use, deterioration is very rapid, particularly because it is difficult to ensure adequate tension of the cloth on the frame forming the filter panel.

Panels as disclosed in U.S. Pat. No. 6,484,885B1 are also known.

The present invention aims in particular to solve the above-mentioned problems by providing a filter panel which is both stronger and more economical to manufacture, and which guarantees optimal filtration.

SUMMARY OF THE INVENTION

A filter panel for mounting in a drum filter, the filter panel having a peripheral frame to which a filter cloth is fastened, the frame being formed from two longitudinal members which are connected at each end by an end cross-member, characterised in that the filter panel has a lattice of crosspieces which connects the inner edges of the frame to one another, the lattice of crosspieces forming at least a first closed pattern in the centre of the frame and having at least four diagonals which are inclined with respect to the longitudinal members and which extend from the first closed pattern to an inner edge of the frame, and in that the lattice of crosspieces has at least two intermediate cross-members which are parallel to the end cross-members and which are arranged respectively on either side of the first closed pattern.

The invention achieves an optimum compromise between rigidity and flexibility of the filter cloth for installation in a drum filter. In particular, it can be seen in use that, after the filter cloth has been attached to the frame, even if the filter cloth is not yet perfectly tensioned on the frame, a perfect tension of the filter cloth is obtained. The tensioning of the filter cloth allows for excellent filtration performance while ensuring a longer service life of the filter panel.

According to other features of the invention:
- at least four diagonals each extend from the first closed pattern to a corner of the frame;
- at least four diagonals each extend from the first closed pattern to the end of an intermediate cross-member;
- each intermediate cross-member crosses at least two diagonals;
- the lattice of crosspieces forms a second closed pattern concentric with the first closed pattern;
- the lattice of crosspieces comprises oblique crosspieces which cross diagonals and which are inclined with respect to the longitudinal members;
- the lattice of crosspieces has a transverse plane of symmetry intersecting the first closed pattern at its centre;
- the lattice of crosspieces comprises two transverse crosspieces, which each extend transversely from longitudinal member at least to the first closed pattern;
- the lattice of crosspieces comprises two longitudinal crosspieces, which each extend longitudinally from an end cross-members to an intermediate cross-members;
- the first closed pattern is a polygon with at least four sides, preferably six sides;
- at least four diagonals are connected to the first closed pattern at a corner of the polygon;
- The cross-section of the crosspieces forming the lattice of crosspieces has a trapezoidal profile, the apex of which is oriented on the side of the filter cloth;
- the lattice of crosspieces comprises at least two intermediate crosspieces whose trapezoidal profile defines an area at least 20% greater than the area defined by the trapezoidal profile of the diagonals;
- the first closed pattern repeats at least once on each side of the closed pattern located in the centre of the frame;
- the frame and the lattice of crosspieces are made in one piece by moulding in plastic;
- the filter cloth is made of plastic and welded to one side of the frame including the corresponding side of the lattice of crosspieces.

The invention also provides a drum filter for filtering a liquid, the drum filter comprising a drum rotatably mounted in a vessel, characterised in that it comprises filter panels according to any of the foregoing features which are attached to the drum.

BRIEF DESCRIPTIONS OF THE FIGURES

Further features and advantages of the invention will become apparent from the following detailed description, for the understanding of which reference is made to the annexed drawings in which:

FIG. 5 is a top view with tear-off showing the filter panel of FIG. 3 with its filter cloth partially torn off;

FIG. 6 is a cross-sectional view A-A of a cross-section of the filter panel in FIG. 3;

FIG. 7 is a cross-sectional view B-B showing the cross-section of a secondary intermediate cross-member of the filter panel in FIG. 3;

DETAILED DESCRIPTION OF THE INVENTION

In the following description, identical, similar or analogous elements will be referred to by the same reference numbers.

Figure 1:
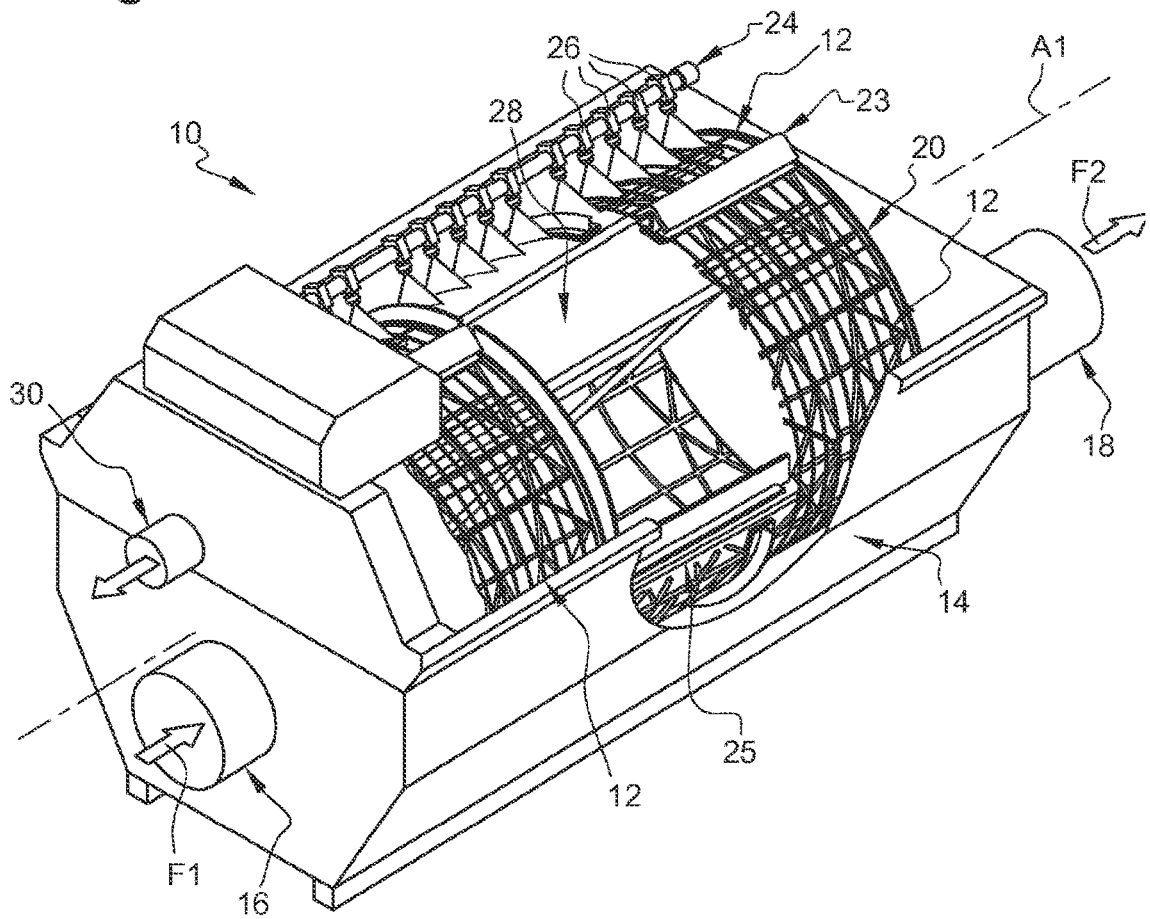
FIG. 1 is a perspective view showing a drum filter with filter panels in accordance with the teachings of the invention.

In FIG. 1, a drum filter 10 with filter panels 12 according to the teachings of the invention is shown.

The drum filter 10 has a vessel 14 with an inlet 16 for the liquid to be filtered and an outlet 18. The direction of flow of the liquid inside the drum filter 10 is represented by the arrows F1 and F2.

Inside the tank 14, a drum 20 is mounted for rotation about a horizontal axis A1. The drum 20 has a cylindrical structure on which the filter panels 12 are mounted.

According to the illustrated embodiment, the drum 20 comprises six filter panels 12, more particularly three series of two filter panels 12. According to the configuration shown, and as illustrated by the diagram in FIG. 2, two filter panels 12 are used to form a complete circumference of the drum 20. There are thus two filter panels 12 in each set which are mounted curved on the drum 20 and then fixed to the drum 20, for example by means of a fixing plate 23, 25 so as to form a portion of a cylinder. Thus, in this embodiment, each filter panel 12 has a generally semi-circular profile when mounted on the drum 20.

According to alternative embodiments (not shown), the drum 20 may comprise a greater or lesser number of sets of filter panels 12, and it may comprise a greater number of filter panels 12 per set. For example, a circumference of the drum may be achieved by means of four filter panels 12 when a larger diameter drum 20 is desired without changing the size of the filter panels 12.

The drum filter 10 also has a spray bar 24 with a plurality of spray nozzles 26. This spray bar 24 extends here parallel to the axis of rotation A1, outside the drum 20, so that the filter panels 12 can be unclogged. In addition, a channel 28 is arranged inside the drum 20, in its upper part, so as to recover the residues resulting from the unclogging of the filtering panels 12, and so as to evacuate them to the outside of the drum filter 10 via an evacuation orifice 30.

Figure 3:
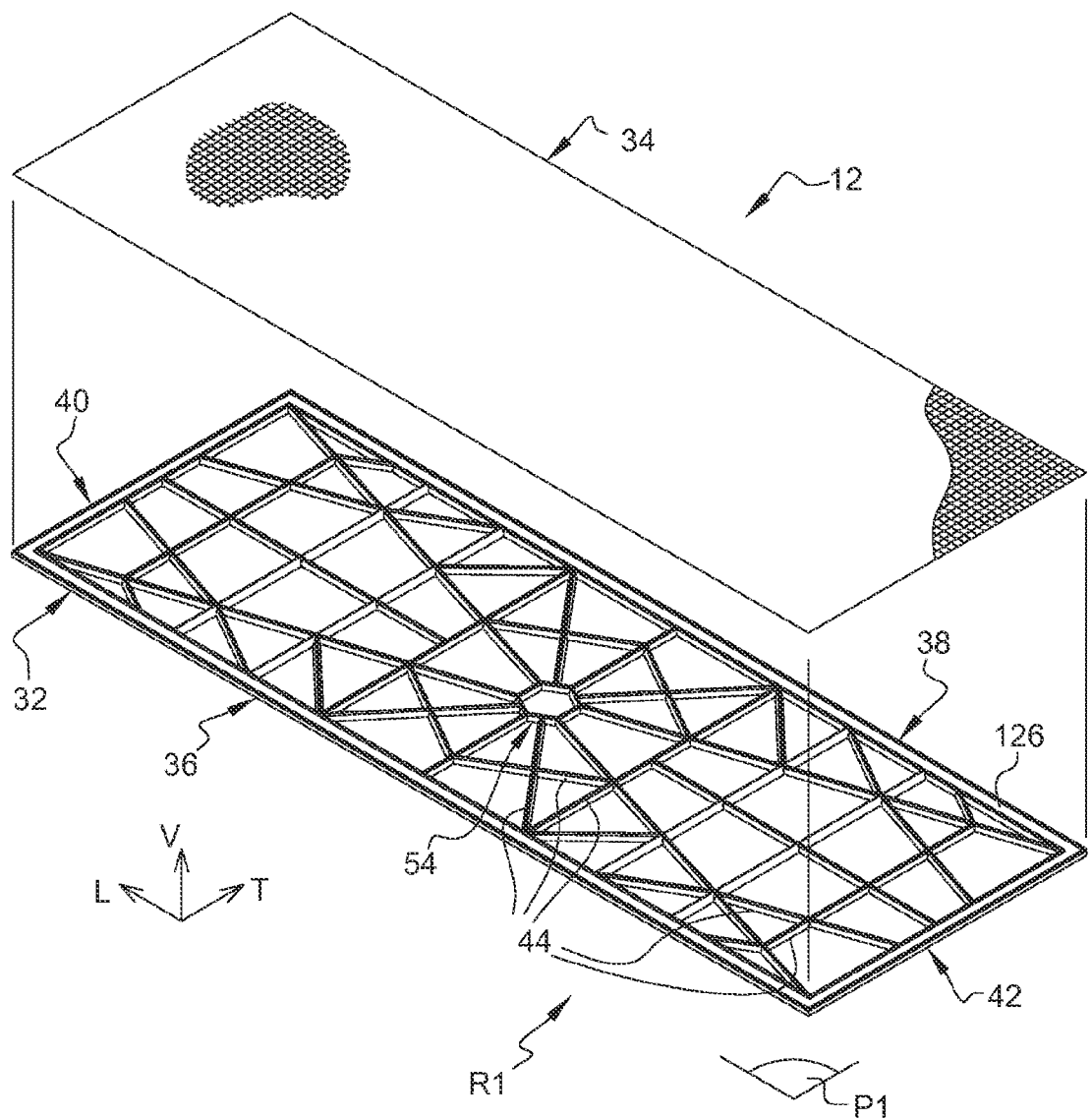
FIG. 3 is an exploded perspective view showing a filter panel of the drum filter of FIG. 1 before mounting on the drum and with its filter cloth before fixing the filter cloth to a frame of the filter panel.
Figure 4:
FIG. 4 is a side view showing the filter panel of FIG. 3 with its filter cloth attached to the top.

Before being mounted in the drum filter 10, each filter panel 12 is in the form of a relatively flat plate, as shown in FIGS. 3 to 5. The filter panel 12 here extends in a horizontal plane P1.

For the description of the invention and the understanding of the claims, the vertical, longitudinal and transverse orientations according to the reference V, L, T indicated in FIGS. 3 to 7, whose longitudinal L and transverse T axes extend in a horizontal plane, will be adopted, by way of non-limitation and without restrictive reference to terrestrial gravity, when the filtering panel 12 is in the state of a plate, i.e. before assembly on the drum 20. A longitudinal orientation from the back to the front along the L-axis, which corresponds to an orientation from the bottom to the top in view of FIG. 5, and a transverse orientation from the left to the right along the T-axis, which corresponds to an orientation from the left to the right in view of FIG. 5, will be used as a non-limiting example.

The filter panel 12 comprises a peripheral frame 32 to which a filter cloth 34 is attached. The frame 32 is formed by two longitudinal members 36, 38 which are connected at each end by an end cross-member 40, 42.

Figure 2:
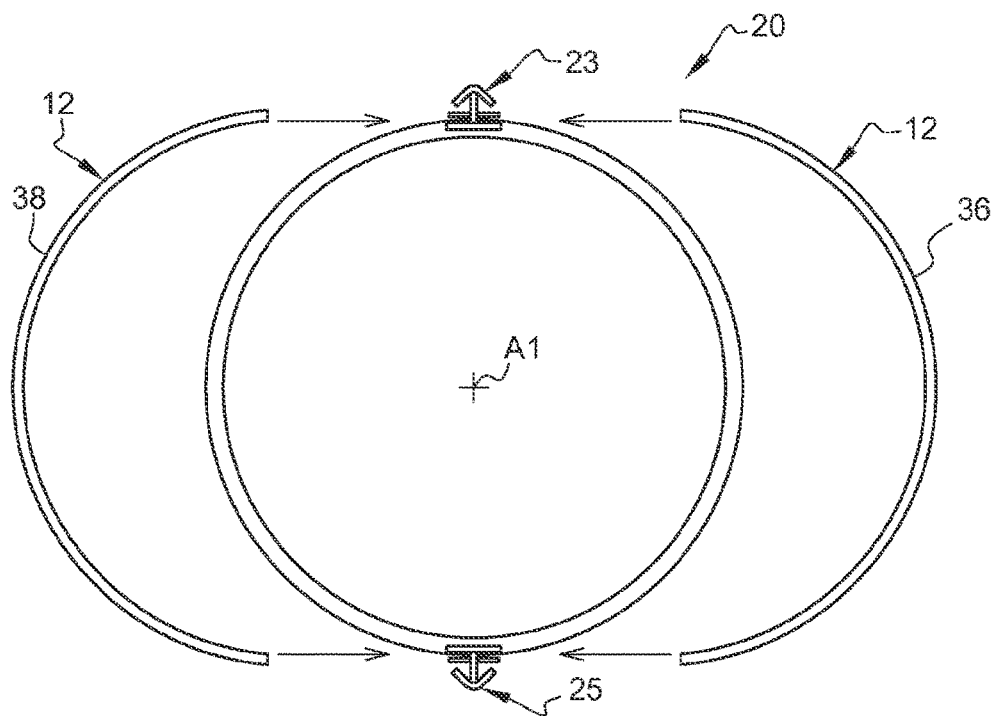
FIG. 2 is a schematic side view showing the mounting of two filter panels on the drum of the drum filter shown in FIG. 1.

A lattice R1 of crosspieces 44 connects the inner edges 46, 48, 50, 52 of the frame 32 to each other. By lattice R1 of crosspieces 44 is meant here a mesh of crosspieces or bars, in the plane P1 of the filter panel 12, which contribute to ensuring a certain rigidity of the frame 32 while allowing the filter panel 12 to bend about a transverse axis, along the longitudinal members 36, 38, to allow the filter panels 12 to be mounted on the drum 20 in a position where the longitudinal members 36, 38 form an arc of a circle as illustrated in FIG. 2.

Advantageously, the lattice R1 of crosspieces 44 forms a first closed pattern 54 in the centre of the frame 32. By closed pattern is meant here a shape drawn by a set of contiguous crosspieces 44. The first closed pattern 54 is here a hexagon and is here empty, i.e. it is not crossed by any cross-bar 44.

In alternative embodiments (not shown), the first closed pattern could be another type of polygon, for example a square, an octagon. Alternatively, the first closed pattern could be a circle or an oval shape.

According to the illustrated embodiment, the hexagon has two opposing first sides 56, 58 which are parallel to the end rails 40, 42, and thus transverse. As the first closed pattern 54 is centred in the frame 32, the hexagon has two opposing first vertices 60, 62 which are positioned midway between the two end rails 40, 42.

Advantageously, the lattice R1 of crosspieces 44 comprises at least four diagonals, in this case eight diagonals 64, 66, 68, 70, 72, 74, 76, 78, which are inclined with respect to the longitudinal members 36, 38 and which extend from the first closed pattern 54 to an inner edge 46, 48 of the frame 32.

According to the embodiment shown, four primary diagonals 64, 66, 68, 70 each extend from the middle of a side 80, 82, 84, 86 of the hexagon which is inclined to the end rails 40, 42, to the inner edge 46, 48 of the opposing side rail 36, 38. Four secondary diagonals 72, 74, 76, 78 each extend from the end of one of the first sides 56, 58 of the hexagon to a corner 88, 90, 92, 94 of frame 32.

Advantageously, the lattice R1 of crosspieces 44 comprises intermediate cross-members 96, 98, 100, 102 which are parallel to the end crosspieces 40, 42, and which are arranged respectively on either side of the first closed pattern 54. Here two primary intermediate cross-members 96, 98, on either side of the first closed pattern 54, each connect the two longitudinal members 36, 38 at the level of the end of one of the primary diagonals 64, 66, 68, 70.

Here four secondary intermediate cross-members 100, 102, arranged on either side of the first closed pattern 54, each connect the two longitudinal members 36, 38.

In the illustrated embodiment, the secondary intermediate cross-members 100, 102 cross the secondary diagonals 72, 74, 76, 78.

Advantageously, the lattice R1 of crosspieces 44 forms a second closed pattern 104 concentric with the first closed pattern 54. The second closed pattern 104 is here a hexagon whose sides parallel to the end cross-members 40, 42 are formed by central portions 106, 108 of the primary intermediate crosspieces 96, 98, and whose other sides are formed by oblique crosspieces 110, 112, 114, 116 which cross the primary diagonals 64, 66, 68, 70 and which are inclined with respect to the longitudinal members 36, 38.

Advantageously, the lattice R1 of crosspieces 44 comprises two transverse crosspieces 118, 120, each of which extends transversely from the first closed pattern 54, here from the first two vertices 60, 62 of the hexagon, to the opposing longitudinal member 36, 38.

According to one embodiment, the two transverse crosspieces 118, 120 may extend to the centre of the first closed pattern 54 and thus form a continuous crossbar from one edge of the frame 32 to the other.

Advantageously, the lattice R1 of crosspieces 44 comprises two longitudinal crosspieces 122, 124 which each extend longitudinally from an end cross-members 40, 42, here from the middle of each end cross-members 40, 42, to an intermediate cross-members 96, 98, 100, 102, here to each primary intermediate cross-members 96, 98.

According to the illustrated embodiment, the lattice R1 of crosspieces 44 has a transverse plane of symmetry P2 intersecting the first closed pattern 54 at its centre and passing through the transverse crosspieces 118, 120.

As illustrated in FIGS. 6 and 7, the crosspieces 44 preferably have a generally triangular or trapezoidal cross-section, the apex of which is oriented towards the filter cloth 34. FIG. 6 shows the cross-section of the majority of the crosspieces 44, including in particular the diagonals 64, 66, 68, 70, 72, 74, 76, 78, the primary intermediate cross-members 96, 98, the oblique crosspieces 110, 112, 114, 116.

In FIG. 7, the cross-section of a secondary intermediate cross-members 100, 102 is shown. This cross-section is larger than the cross-section of the other crosspieces 44 due to the stiffening function of the secondary intermediate crosspieces 100, 102. For example, the trapezoidal profile here defines an area 20% to 40% larger than the area defined by the trapezoidal profile of the other crosspieces 44.

Advantageously, the frame 32 and the lattice R1 of crosspieces 44 are made in one piece by injection of plastic material in a mould, for example of polyethylene (HDPE), or polypropylene (PP), or polyamide (PA) such as nylon. The frame 32 may be made of the same plastic material as the filter cloth 34.

Advantageously, the filter cloth 34 is welded to the top surface 126 of the frame 32, including the top surface of the lattice R1 of crosspieces 44. Thus, as illustrated in FIGS. 6 and 7, the top of each spacer 44 is welded to the filter cloth 34. Different welding methods can be used, the aim being to achieve a strong connection between the filter cloth 34 and the frame 32 and the braces 44 by ensuring perfect tension in the filter cloth 34 when the filter panels 12 are bent as in FIGS. 1 and 2.

Note that the filter panel 12 is intended to be mounted in the drum filter 10 so that the filter cloth 34 is on the outer side of the cylinder.

Thanks to the structure of the lattice R1 of crosspieces 44 described above, a good rigidity of the filter panel 12 is obtained while allowing a good flexibility in the longitudinal direction, i.e. by bracing the longitudinal members 36, 38.

The structure of the first closed pattern 54 associated with the diagonals 64, 66, 68, 70, 72, 74, 76, 78 enables the filter panel 12 to withstand the bending stresses that apply more particularly along the transverse plane of symmetry P2. It can be seen that the central part of the lattice R1 of crosspieces 44 forms a spider's web which enables the filtering panel 12 to withstand very high stresses, even when the filtering panel 12 is mounted in the drum filter 10 and supports high loads, in particular a large mass of liquid to be filtered and the sludge collected on the walls of the filtering cloth 34.

A further advantage of the filter panel 12 is that it does not need to have a mesh of overly tightly spaced crosspieces 44 to withstand the stresses. This allows windows 128 to be formed which are large enough to maximise the area of filter cloth 34 in contact with the liquid to be filtered, while minimising the amount of water which is drawn up with the walls of the crosspieces 44 when the drum 20 is rotated to clean the filter panel 12 with the sprinkler nozzles 26.

Without raising too much water with the walls of the crosspieces 44, it is possible, thanks in particular to the secondary intermediate cross-members 100, 102, to raise in an optimal manner the debris and other solid matter contained in the liquid to be filtered, and to allow their evacuation through the gutter 28. Thus, the choice of a larger cross-section for the secondary intermediate cross-members 100, 102, compared with the other crosspieces 44, makes it possible to minimise the quantity of water raised by the majority of the crosspieces 44, while having for the secondary intermediate cross-members 100, 102 sufficient surface area to raise the debris and solid matter.

Figure 8:
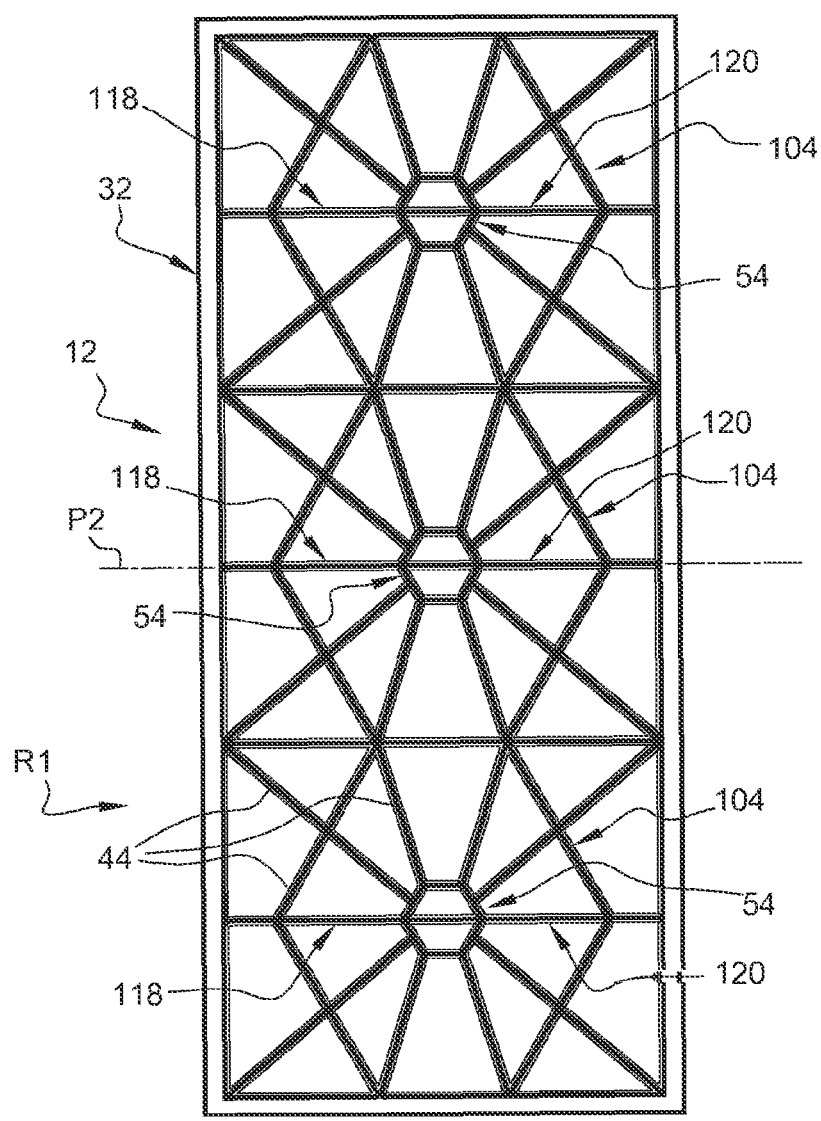
FIG. 8 is a pull-out top view similar to FIG. 5 which shows an alternative design of the filter panel with a latticework of repeated closed patterns.

According to an alternative embodiment shown in FIG. 8, the filter panel 12 differs from that of FIGS. 3 to 7 in that the lattice R1 of crosspieces 44 comprises the central pattern three times, i.e. the first closed pattern 54 and the second closed pattern 104 are repeated once on each side of the group of closed patterns 54, 104 located in the centre of the frame 32.

According to the embodiment shown in FIG. 8, it is noted that the transverse crosspieces 118, 120 extend to the centre of each first closed pattern 54 which here forms three crosspieces on the frame 32. Of course, the embodiment shown in FIG. 8 could also have transverse crosspieces 118, 120 as in the previous embodiment, where the transverse crosspieces 118, 120 stop at the vertices of each first closed pattern 54.

The invention claimed is:
1. A rotary drum filter comprising:
a filter panel including:

a peripheral frame being formed from two longitudinal members which are connected at each end by an end cross-member;

a lattice (R1) of crosspieces which connects inner edges of the peripheral frame to one another, the lattice (R1) of crosspieces forming at least a first closed pattern in the center of the peripheral frame and having at least four diagonals which are angled with respect to the longitudinal members and which extend from the first closed pattern to an inner edge of the peripheral frame, the lattice (R1) of crosspieces has at least two intermediate cross-members which are parallel to the end cross-members and which are arranged respectively on either side of the first closed pattern; and a filter cloth capable of capturing particles in a liquid flow, is fastened to one side of the peripheral frame and completely covers a corresponding side of the lattice (R1).

2. The rotary drum filter of claim 1, wherein, the at least four diagonals each extend from the first closed pattern to a corner of the peripheral frame.

3. The rotary drum filter of claim 1, wherein, the at least four diagonals each extend from the first closed pattern to the end of an intermediate cross-member.

4. The rotary drum filter of claim 1, wherein, each intermediate cross-member crosses at least two diagonals.

5. The rotary drum filter of claim 1, wherein, the lattice (R1) of crosspieces forms a second closed pattern concentric with the first closed pattern.

6. The rotary drum filter of claim 1, wherein, the lattice (R1) of crosspieces comprises oblique crosspieces which cross diagonals and which are angled with respect to the longitudinal members.

7. The rotary drum filter of claim 1, wherein, the lattice (R1) of crosspieces has a transverse plane of symmetry (P2) intersecting the first closed pattern at its center.

8. The rotary drum filter of claim 1, wherein, the lattice (R1) of crosspieces comprises two transverse crosspieces which each extend transversely from a longitudinal member at least to the first closed pattern.

9. The rotary drum filter of claim 1, wherein, the lattice (R1) of crosspieces comprises two longitudinal crosspieces which each extend longitudinally from an end cross-member to an intermediate cross-member.

10. The rotary drum filter of claim 1, wherein, the first closed pattern is a polygon with at least four sides.

11. The rotary drum filter of claim 10, wherein, the at least four diagonals are connected to the first closed pattern at a corner of the polygon.

12. The rotary drum filter of claim 1, wherein, the first closed pattern is a polygon with six sides.

13. The rotary drum filter of claim 1, wherein, the cross-section of the crosspieces forming the lattice (R1) of crosspieces has a trapezoidal profile, the apex of which is oriented on the side of the filter cloth.

14. The rotary drum filter of claim 13, wherein, the lattice (R1) of crosspieces comprises at least two intermediate crosspieces whose trapezoidal profile defines an area at least 20% greater than the area defined by the trapezoidal profile of the diagonals.

15. The rotary drum filter of claim 1, wherein, the first closed pattern repeats at least once on each side of the closed pattern located in the center of the peripheral frame.

16. The rotary drum filter of claim 1, wherein, the peripheral frame and the lattice (R1) of crosspieces are made in one-piece by molding from plastic.

17. The rotary drum filter of claim 16, wherein, the filter cloth is made of plastic and welded to one side of the peripheral frame including the corresponding side of the lattice (R1) of crosspieces.

18. The rotary drum filter of claim 1, wherein, the rotary drum filter comprises a plurality of filter panels, and is rotatably mounted in a vessel.

\* \* \* \* \*